Patented July 20, 1926.

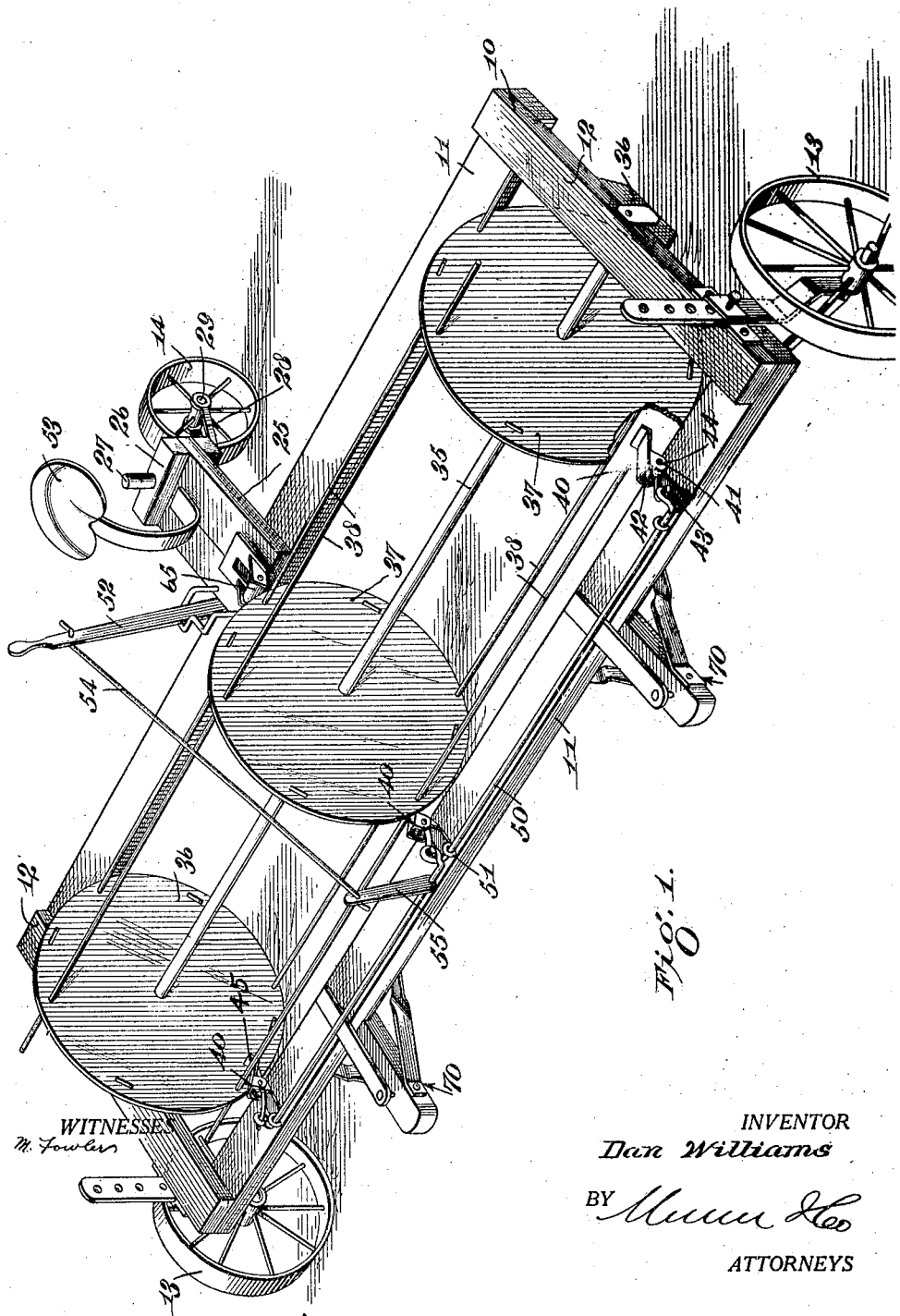

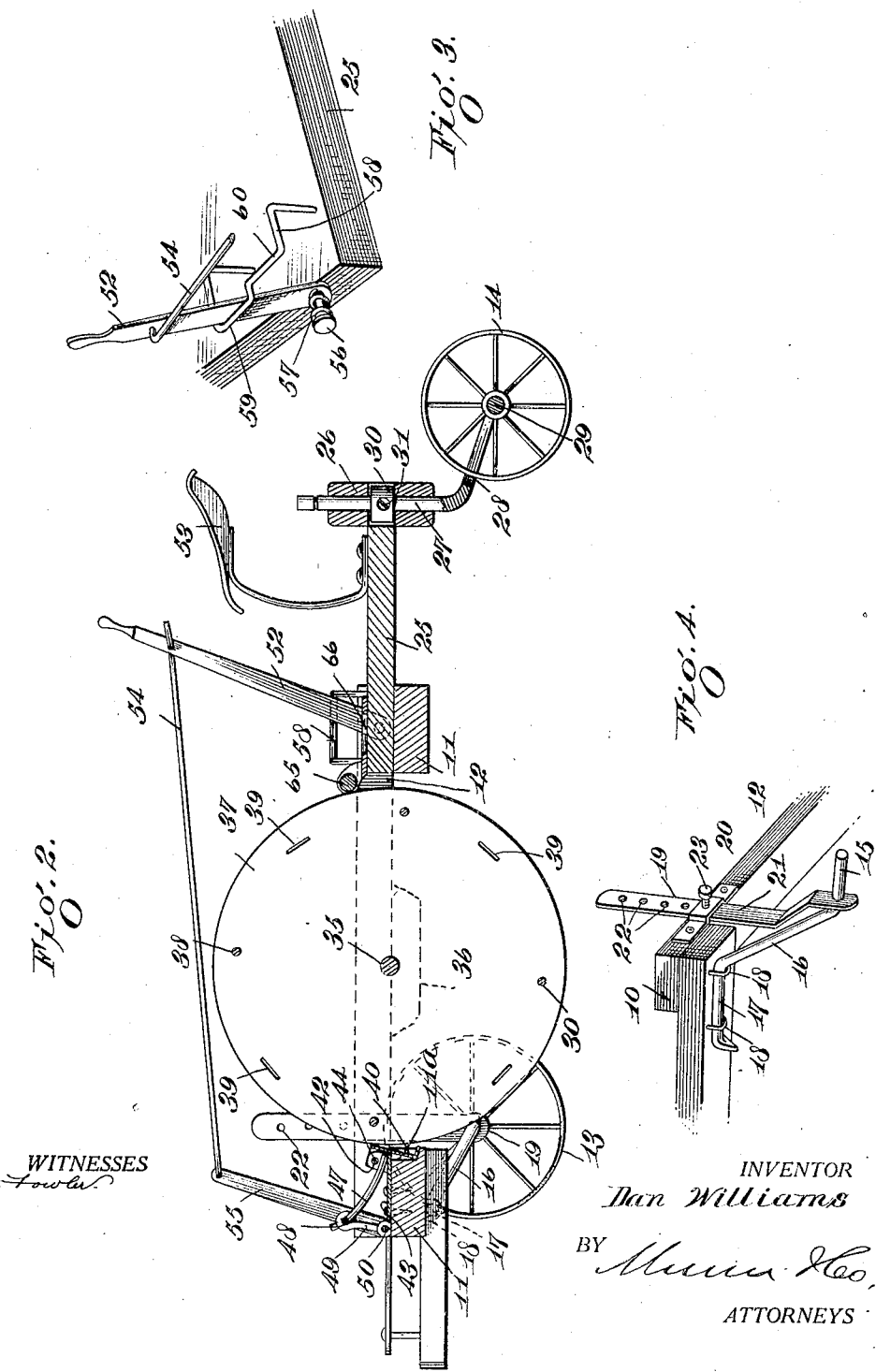

1,593,322

UNITED STATES PATENT OFFICE.

DAN WILLIAMS, OF ALMIRA, WASHINGTON.

WEEDER OR CULTIVATOR.

Application filed May 29, 1924. Serial No. 716,750.

This invention relates to a weeder or cultivator, and the objects and advantages reside in certain novel features of the construction, arrangement and construction of parts, which will be hereinafter more fully described and particularly pointed out in the appended claims, reference being had to the accompanying drawings forming a part of this specification, and in which:

Figure 1 is a perspective view;

Figure 2 is a view in central longitudinal vertical section;

Figure 3 is a detailed perspective view of the keeper of the operating lever; and Figure 4 is a similar view of the adjusting means for the ground wheels.

In the drawing, a frame is designated generally at 10 and includes transverse frame members 11 and longitudinal frame members 12 extending between and secured to the ends of the frame members 11.

The frame is supported by ground wheels 13 arranged at the opposite sides of the forward end of the frame and by a steering wheel 14 arranged centrally of the frame at the rear end thereof.

Each ground wheel 13 is rotatably mounted on a spindle 15 integrally formed on a crank 16 having a bearing portion 17 swingably mounted in bearings 18 provided on the under side of the forward frame member 11 adjacent its ends as shown in detail in Figure 4. A brace bar 19 is provided for each spindle 15, each brace bar 19 having one end pivotally connected to its spindle and having its opposite end slidably fitted in brackets 20 and adjustably secured to the brackets and to the frame member 12. Each bracket 20 has an opening 21 formed therein and each brace bar 19 has a series of openings 22 any one of which openings 22 may be alined with the opening 21. A pin 23 is inserted through the alined openings 21 and 22 and is driven into the adjacent frame member 11 or otherwise secured in position.

A platform 25 is secured to the rear frame member 11 centrally thereof and has a bearing 26 in which a vertically disposed spindle 27 is rotatably mounted, the spindle 27 having an offset fork 28 for an axle 29 provided for the steering wheel 14. A collar 30 fixed to the spindle 28 in any adjustment therealong by means of set screws 31 serves to maintain the vertical adjustment of the spindle.

A main shaft 35 extends transversely of the frame midway between the frame members 11 and is rotatably mounted in bearings 36 provided on the frame members 12. At spaced points along the shaft 35, circular metallic plates or disks 37 are secured and are disposed in parallel relation with respect to each other though at right angles to the shaft 35. A plurality of bars 38 are carried by the disks 37, the bars being arranged in circular series around the disks adjacent their periphery and extending parallel to the shaft 35. Preferably the bars 38 are four in number and are arranged at angular intervals of 90°. As shown in the drawings, the bars 38 may be of circular cross section and when so constructed are received in correspondingly formed openings provided in the disks 37. It is also proposed to use bars of rectangular cross section and for this purpose the disks 37 are formed with rectangular slots midway between the openings which receive the bars 38. The disks 37 have sharp circumferential edges and these disks serve as colters and drag no weeds. The disks 37 and the bars carried thereby constitute the combined weeding and cultivating means of the apparatus.

In order to control and limit the movement of the shaft 35 and consequently the disks 37 and bars 38 as and when desired, a series of hooks 40 is provided on the forward frame member 11, each hook 40 having a pair of apertured pivot ears 41 embracing a pair of similar pivot ears 42 upstanding from a bracket plate 43 secured to the forward frame member 11, the pivot ears 41 and 42 being pivotally connected by a pivot pin 44. The outer end of each hook 40 has a bill 45 engageable with bars 38. The hooks 40 are weighted and are so pivotally mounted as to fall by gravity into a substantially vertical position in notches 11ª in the frame member 11, as shown in Figure 2. In order to position the hooks so as to engage the bars 38, a positioning finger 47 is provided for each hook 40 and is guided in its movements by the pivot pin 44, ears 42 and bracket plate 43, the finger passing between these elements, as will be understood from Figure 2. Each finger 47 has one end pivotally connected, as at 48, to a crank arm provided therefor on a rock shaft 50 mounted in bearings 51 provided on the forward frame member 11. The rock shaft 50 is controlled from a hand lever 52 positioned near an operator's seat 53 provided on the platform 25, the motion of the lever 52 being transmitted to the rock shaft 50 by a connecting rod 54 and a crank arm 55. The lever 52 is mounted on a fulcrum for lateral rocking as well as pivotal movement, the lateral rocking being about the adjacent upper edge of the platform 25. A spring 57 is provided for resiliently holding the lever 52 against lateral rocking. A keeper designated generally at 58 is mounted on the platform 25 and is formed with a slot 59 in which the lever is held by friction and a second seat 60 in which the lever is held by the action of the spring 57. By manipulating the lever 52 the hooks 40 may be shifted into the field of movement of the bars 38 or may be permitted to drop to inactive position, as shown in Figure 2, wherein the hooks will not be engaged with the bars. With this arrangement the turning movement of the shaft 35, disks 37 and bars 38 may be limited to 90°.

A roller 65 is mounted on a bracket 66 fixed to the platform 25, the roller being positioned just behind the central disk 37.

The forward frame member 11 is provided with a number of draft hitches 70.

I claim:

1. In an apparatus of the character described, a frame, a shaft rotatably mounted on said frame, disks carried by said shaft, longitudinal bars carried by the disks, the bars being arranged in circular series, hooks carried by the frame and adapted to be positioned to directly engage the bars or to be positioned so as to lie out of the path of movement of the bars and manually operable means for controlling the position of said hooks.

2. In an apparatus of the character described, a frame, a shaft rotatably mounted on said frame, disks carried by said shaft, longitudinal bars carried by the disks, the bars being arranged in circular series, hooks carried by the frame and adapted to be positioned to directly engage the bars or to be positioned so as to lie out of the path of movement of the bars and manually operable means for controlling the position of said hooks, said manually operable means including a rock shaft, positioning fingers operated from the rock shaft and coacting with the hooks, and a lever for actuating the rock shaft.

3. In an apparatus of the character described, a frame, a shaft rotatably mounted on said frame, disks carried by said shaft, longitudinal bars carried by the disks, the bars being arranged in circular series, hooks carried by the frame and adapted to be positioned to directly engage the bars or to be positioned so as to lie out of the path of movement of the bars and manually operable means for controlling the position of said hooks, said manually operable means including a rock shaft, positioning fingers operated from the rock shaft and coacting with the hooks, a lever for actuating the rock shaft, and a keeper for the lever having a plurality of seats in which the lever is adapted to be releasably held.

DAN WILLIAMS.